(12) United States Patent
Dillen et al.

(10) Patent No.: US 10,775,519 B2
(45) Date of Patent: Sep. 15, 2020

(54) X-RAY IMAGING SYSTEM, X-RAY SENSOR, AND METHOD FOR MANUFACTURING AN X-RAY SENSOR

(71) Applicant: Teledyne Dalsa B.V., Eindhoven (NL)

(72) Inventors: Bartholomeus Goverdina Maria Henricus Dillen, Geldrop (NL); Chiel Smit, Waalre (NL); Willem Hendrik Maes, Lommel (BE); Alouisius Wilhelmus Marinus Korthout, Drunen (NL); Andrey Lomako, Waterloo (CA); James Miller, Tavistock (CA)

(73) Assignee: TELEDYNE DALSA B.V., Eindhoven (NL)

( * ) Notice: Subject to any disclaimer, the term of this patent is extended or adjusted under 35 U.S.C. 154(b) by 201 days.

(21) Appl. No.: 15/743,412

(22) PCT Filed: Aug. 17, 2015

(86) PCT No.: PCT/EP2015/068836
§ 371 (c)(1),
(2) Date: Jan. 10, 2018

(87) PCT Pub. No.: WO2017/028893
PCT Pub. Date: Feb. 23, 2017

(65) Prior Publication Data
US 2018/0203138 A1    Jul. 19, 2018

(51) Int. Cl.
*G01T 1/24* (2006.01)
*G01T 1/20* (2006.01)

(52) U.S. Cl.
CPC ............ *G01T 1/247* (2013.01); *G01T 1/2018* (2013.01); *G01T 1/243* (2013.01)

(58) Field of Classification Search
CPC ........ G01T 1/247; G01T 1/243; G01T 1/2018
See application file for complete search history.

(56) References Cited

U.S. PATENT DOCUMENTS

| 5,440,130 A | * | 8/1995 | Cox | ...................... G01T 1/2018 |
| | | | | 250/370.09 |
| 5,887,049 A | | 3/1999 | Fossum | |
| 6,393,097 B1 | * | 5/2002 | Aufrichtig | ............ G01T 1/1644 |
| | | | | 250/370.09 |

(Continued)

FOREIGN PATENT DOCUMENTS

| EP | 2873967 A1 | 5/2015 |
| EP | 2879373 A2 | 6/2015 |

OTHER PUBLICATIONS

International Search Report and Written Opinion of the International Searching Authority for International Application No. PCT/EP2015/068836 dated May 6, 2016.

(Continued)

*Primary Examiner* — David P Porta
*Assistant Examiner* — Djura Malevic
(74) *Attorney, Agent, or Firm* — K&L Gates LLP (57) ABSTRACT

The present invention relates to an X-ray imaging system. The invention further relates to an X-ray sensor to be used in such system and to a method for manufacturing such sensors.
According to the invention, the combination of a lower saturation dose and obtaining a plurality of image frames during a single exposure, can be used to form a final X-ray image having an improved dynamic range.

17 Claims, 5 Drawing Sheets

(56) References Cited

U.S. PATENT DOCUMENTS

| | | | | |
|---|---|---|---|---|
| 6,448,544 | B1* | 9/2002 | Stanton | G01T 1/2928 250/208.1 |
| 8,576,986 | B2* | 11/2013 | Liu | G01T 1/247 378/98.8 |
| 2004/0094720 | A1* | 5/2004 | Dagan | G01T 1/247 250/370.12 |
| 2006/0203959 | A1* | 9/2006 | Spartiotis | A61B 6/14 378/38 |
| 2012/0189100 | A1* | 7/2012 | Liu | G01T 1/247 378/62 |
| 2015/0146853 | A1* | 5/2015 | Spartiotis | A61B 6/466 378/62 |
| 2017/0123079 | A1* | 5/2017 | Jacob | G01T 1/2018 |

OTHER PUBLICATIONS

Tabet, Muahel, "Double sampling techniques for CMOS Image Sensors", Waterloo, Ontario, Canada, Jan. 2002, retrieved from http://www.cse.yorku.ca/visor/resources/Tabet_PhD_thesis.pdf, 355 pages.

Maes et al., "Low-dose performance of wafer-scale CMOS-based X-ray detectors", Proc. of SPIE, Mar. 2015, vol. 9412, pp. 94120C-1-94120C-11.

\* cited by examiner

X-RAY IMAGING SYSTEM, X-RAY SENSOR, AND METHOD FOR MANUFACTURING AN X-RAY SENSOR

This application is a national stage application claiming priority to and the benefit of International Application No. PCT/EP2015/068836, filed on Aug. 17, 2015.

The present invention relates to an X-ray imaging system. The invention further relates to an X-ray sensor to be used in such system and to a method for manufacturing such sensors.

X-ray imaging systems are known in the art. These systems typically comprise an X-ray source for emitting X-rays and an X-ray detector system configured for detecting X-rays and for obtaining an image frame based on the detected X-rays.

The X-ray source emits X-rays at a given dose rate. Typically, this dose rate can be set by the operator in dependence of the type of imaging. For instance, if X-ray imaging is to be used to visualize tissue that shows an overall high absorption of X-rays, a higher dose may be required.

Various X-ray sensors are known in the art. Most X-ray sensors rely on the conversion of incoming X-rays into visible light using a scintillator. This visible light can subsequently be detected using a light-sensitive component, such as a charged coupled device (CCD) or photodiode. Recently, CMOS based X-ray sensors have emerged on the market. CMOS technology is typically characterized by the high frequencies at which the components are able to operate.

Normally, the X-ray sensor is operated close to saturation to achieve a high signal-to-noise ratio. Moreover, an X-ray sensor can be characterized by its saturation dose. This dose corresponds to the dose that may fall onto the sensor, assuming that the X-rays are uniformly distributed over the sensor surface, which exactly causes saturation of the sensor. The dose delivered to the X-ray sensor depends inter alia on the dose rate of the X-ray source, the exposure time, the amount of absorption in between the X-ray source and X-ray sensor. Furthermore, if an incoming dose exceeds the saturation dose of the sensor, the recorded image will display saturation in one or more parts of the image.

In the art, X-ray sensors are selected based on the application and/or the dose rate of the X-ray source to be used. Given a given target application, having a given exposure time range and desired dose rate range, an X-ray sensor will be chosen that will have nearly reached saturation for most of these settings when the X-ray exposure ends.

It is an object to provide an improvement of the X-ray imaging systems described above in which the signal-to-noise ratio of the resulting images is improved and/or in which the X-ray detector system is able to operate acceptably in a larger range of dose rates and exposure times.

This object has been achieved using an X-ray imaging system for obtaining an X-ray image of an object during a single exposure thereof as defined in claim 1. This system is characterized in that the X-ray detector system is configured for obtaining a plurality of image frames at a given frame rate during the single exposure and in that the X-ray detector system is configured for constructing the X-ray image using the obtained plurality of image frames. The frame rate is preferably constant in time. However, the present invention does not exclude embodiments wherein the frame rate changes in time.

Hence, according to the present invention, the X-ray sensor is not operated such that it nearly reaches saturation at the end of the exposure time, as is common practice in the art. Instead, a plurality of X-ray image frames is recorded during a single exposure. Preferably, these image frames are recorded using an X-ray sensor that operates near saturation each time an image frame is recorded. Accordingly, an X-ray sensor can be used that has a much smaller saturation dose than the X-ray sensor that would normally be used. The applicant has found that using a plurality of X-ray image frames, obtained using a low saturation dose X-ray sensor, to construct a single X-ray image, provides better results in terms of signal-to-noise ratio than constructing such X-ray image using a single image frame obtained using a high saturation dose X-ray sensor. In addition, the frame rate, being the rate at which image frames are obtained, can normally be set by the operator. This allows the same X-ray detector system to be used in a larger range of applications. For instance, if a higher dose rate is to be desired, the frame rate could be increased to reduce the chance of pixels saturating. Conversely, if a lower dose rate is desired, the frame rate could be lowered to allow image frames to be obtained using an X-ray sensor that operates close to saturation.

The X-ray detector system may be configured to construct the X-ray image by summing the obtained plurality of image frames or by averaging the obtained plurality of image frames. For instance, each image frame comprises pixel values having a bit depth of 10 bits. If four image frames are summed, pixel values may need to be expressed using a bit depth of 12 bits. Alternatively, pixel values may be averaged. This will still require a higher bit depth of 12 bits to express the rational pixel value.

The X-ray imaging system, preferably the X-ray source, may further comprise a dose setting unit for setting exposure settings in dependence of a target application of the X-ray imaging system, wherein the exposure settings preferably comprise an exposure time. The dose setting unit may comprise a collimator or other X-ray absorbing elements to limit the amount of X-rays generated by the X-ray source. Alternatively, the number of electrons that are decelerated to generate the X-rays may be controlled.

In an embodiment, the X-ray detector system comprises an X-ray sensor having an array of pixels, read-out circuitry for reading out the array of pixels for forming the image frame, and a control unit for controlling the read-out circuitry. Here, the control unit may be configured to determine the frame rate at which image frames are obtained. More in particular, the control unit may control the timing of the various components in the read-out circuitry such that this circuitry reads out the pixel values at the desired frame rate. Typically, the read-out circuitry performs a read-out of the pixel values in combination with a reset of the pixel values.

A full-well capacity of the pixels may result in a sensor saturation dose that matches a combination of a dose rate of the X-ray source and the frame rate. Each pixel is characterized by a full-well capacity that indicates the amount of charge that can be stored in that pixel before saturating. The full-well capacities of all pixels determine, in part, the saturation dose of the X-ray sensor. Other components such as the scintillator also determine how the full-well capacity relates to the saturation dose. Assuming that the X-rays generated by the X-ray source all fall onto the X-ray sensor in a uniformly distributed manner, the saturation dose of the sensor preferably corresponds to the dose rate of the X-ray sensor divided by the frame rate. For example, if a dose rate of the X-ray source equals 8 mGy/s, and a frame rate of 8 image frames per second is used, the saturation dose preferably equals 1 mGy. The skilled person readily understands that such correlation between dose rate, frame rate, and saturation dose changes in case the X-rays only partially cover the X-ray sensor or if the distribution of the X-rays or the X-ray sensor itself is not uniform.

The combination of the full-well capacity, the dose rate of the X-ray source, and the frame rate is preferably such that when the X-ray source emits X-rays at the dose rate and the array of pixels is read out at the frame rate, the pixels in the pixel array operate close to or at saturation.

The frame rate of the read-out circuitry may be set by the control unit within a predefined range and/or the dose rate of the X-ray source may be set within a predefined range. This helps to optimize the performance of the X-ray imaging system to provide X-ray images having a high signal-to-noise ratio.

The X-ray detector system may further comprise an image constructing unit for constructing the X-ray image using the obtained plurality of image frames, the image constructing unit being preferably configured to sum or average the obtained plurality of image frames. The image constructing unit may be realized outside of the X-ray sensor. For instance, a remote computer may be used to perform the X-ray image construction. In such case, the X-ray sensor provides the remote computer with the individual image frames, whereas the remote computer, having a relatively large amount of computing power, constructs the final X-ray image.

The X-ray detector system may comprise a triggering unit, which is configured to detect whether an obtained image frame or one or more predefined regions thereof comprises one or more pixel values that exceed the noise floor or a predefined level, and wherein the control unit is configured to control the image constructing unit to start summing or averaging the obtained image frames only after the triggering unit has detected such pixel values. For instance, the read-out circuitry may be operated to essentially continuously read-out pixel values at the given frame rate. Hence, in such system there may not be feedback from the X-ray source to the read-out circuitry to start reading out the pixel values. The triggering unit monitors the obtained image frames to check whether a single pixel or a combination of pixels in an image frame or region thereof has a pixel value that is indicative for the capture of an X-ray due to the X-ray exposure by the X-ray source. When such pixel values are detected, the triggering unit assumes that the X-ray exposure has started and will instruct the image constructing unit to start with constructing the X-ray image. This does not mean that the actual summing or averaging starts directly after detecting such pixel values. In some embodiments, the image frames are all stored in memory or are exported to a processing unit external to the X-ray sensor such that the X-ray image is constructed long after the X-ray exposure has ended. In other embodiments, the averaging or summing is performed directly after obtaining the image frames. For instance, the image constructing unit may comprise a memory for holding two image frames. The memory is then able to hold a last intermediate image frame and a newly obtained image frame. The last intermediate image comprises the sum of all the obtained image frames prior to the newly obtained image frame during that exposure. The image constructing unit may further comprise a processing unit to add the pixel values of the last intermediate image and the newly obtained image frame to construct a new last intermediate image.

In case the image constructing unit is configured for averaging the obtained image frames, it may further comprise a counter for counting the number n of obtained image frames. A pixel value $p_{i,new}$ for a pixel i in the new last intermediate image may then be computed using the pixel value $p_{i,inter}$ for a pixel i in the last intermediate image and a pixel value $p_{i,last}$ for a pixel i in the newly obtained image using $p_{i,new}=(p_{i,inter}\times(n-1)+p_{i,last})/n$.

In addition to the above, the control unit may be configured to control the image constructing unit to stop summing or averaging the obtained image frames after the triggering unit has detected that newly obtained image frames or the one or more predefined regions thereof do no longer comprise one or more pixel values that exceed the noise floor or a predefined level. This also includes an embodiment wherein an image constructing unit remote from the X-ray sensor disregards image frames that have been obtained after said detection by the triggering unit or an embodiment wherein such image frames are not sent to the image constructing unit at all.

The image constructing unit may comprise a motion correction unit, which unit is configured to perform motion correction on the plurality of obtained image frames prior to summing or averaging the image frames to form the X-ray image. In such embodiment, it is preferred to first store the individual image frames either in the image constructing unit or in a dedicated memory, and to then perform the motion correction on the stored image frames.

As described above, the image constructing unit may be configured to construct an intermediate X-ray image at a point in time during an X-ray exposure using the plurality of image frames obtained thus far. The X-ray imaging system may then be further configured to evaluate the intermediate X-ray image and to determine a quality parameter of the intermediate X-ray image and to perform dose control of the X-ray source based on the quality parameter, wherein the quality parameter preferably comprises an intensity in a darkest part of the intermediate X-ray image or a contrast in the intermediate X-ray image or region thereof. By evaluating the intermediate image, it may be possible to determine prior to expiry of the intended exposure time that enough information is available. It may then be decided to control the dose of the X-ray source. For example, performing dose control may comprise adjusting a dose rate, an exposure time, or collimator setting of the X-ray source. As a further example, the X-ray source could be stopped altogether thereby preventing unnecessary X-ray exposure of the patient.

The image constructing unit may comprise a temporal filtering unit, which unit is configured to detect one or more regions having deviating pixel values in an image frame among the plurality of image frames, the one or more regions being only detectable in one or a few of the obtained image frames, the temporal filtering unit being configured to disregard the region(s) during the X-ray image constructing. Also in this case, it is beneficial to first store all the image frames prior to performing temporal filtering. Examples of deviating pixel values may be glitches in an otherwise black image or detector-related artefacts.

The X-ray detector system may comprise an X-ray sensor, wherein the X-ray sensor is a CMOS X-ray sensor, an amorphous-silicon or polymer based detector or a charge-coupled device. The X-ray detector system may also comprise a direct conversion based X-ray sensor, wherein X-rays are detected without the intermediate step of converting the X-rays to visible light. Examples of such sensors are amorphous Selenium based sensors. In case a CMOS X-ray sensor is used, the full-well capacity is typically determined by the storage capacitor that is connected to a photodiode.

The X-ray imaging system may comprise a CMOS X-ray sensor having a pixel array comprising 3T type pixels, and wherein the read-out circuitry is configured for reading out the array of pixels using a double data sampling (DDS) technique. The applicant has found that the combination of using a plurality of image frames and applying a DDS technique for this type of sensor greatly reduces the impact of reset noise on the dynamic range of the resulting X-ray image.

One or more of the group consisting of the image constructing unit, the read-out circuitry, and the control unit may be integrated in the X-ray sensor.

According to a second aspect, the present invention provides an X-ray sensor suitable for use in an X-ray system, wherein the X-ray sensor is configured as described above.

According to a third aspect, the present invention provides a method for manufacturing an X-ray sensor having an array of pixels that is intended to be implemented in an X-ray imaging system that is configured to operate using a given dose rate, the method comprising the steps of selecting read-out circuitry to be used in or for the X-ray sensor, the read-out circuitry having a given frame rate, determining a desired saturation dose of pixels of the X-ray sensor based on the frame rate and the dose rate, determining a full-well capacity from the determined saturation dose, and manufacturing the X-ray sensor using the determined full-well capacity.

Next, the invention is described in more detail referring to the appended drawings, wherein.

Figure 1:
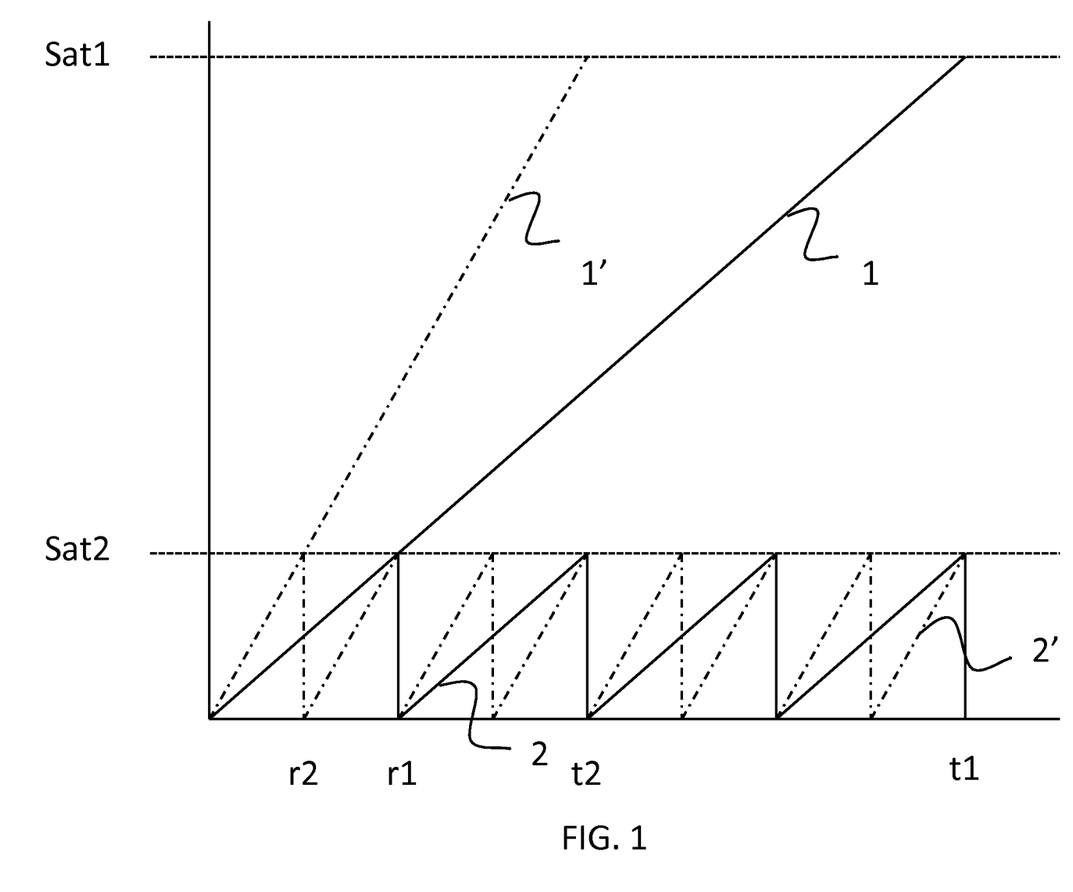
FIG. 1 illustrates the general concept of the present invention.

FIG. 1 illustrates the general concept of the present invention. Here, a known X-ray imaging system is compared to the X-ray imaging system according to the present invention. In the known system, the X-ray sensor is operated such that it nearly reaches saturation during a single exposure.

In FIG. 1, the build up of charge in the sensor as a function of time is illustrated schematically. Here, a linear curve is assumed for the sake of simplicity. Actual sensors generally show a different behaviour as will become evident later.

Charging curve 1 of the known system and charging curve 2 of the X-ray imaging system in accordance with the present invention differ in that the former system saturates when a dose Sat1 has been applied to the sensor, whereas the latter saturates at a much lower dose Sat2.

The X-ray exposure lasts up to time t1. As can be seen in the figure, the known system reaches saturation once at time t1, whereas the X-ray sensor of the present invention has reached saturation four times during the exposure period. Contrary to the known system, the X-ray sensor of the present invention is reset four times during the exposure. The resetting occurs at regular intervals denoted by r1.

The process of reading out the X-ray sensor is referred to as obtaining an image frame. In the known system, an image frame is obtained only once during a single exposure, whereas according to present invention, a plurality of image frames is obtained. This process can be characterized by the frame rate that indicates how much image frames are obtained per second.

Now assuming that the dose rate of the X-ray source doubles, the X-ray sensor of the known system will charge more quickly as indicated by curve 1'. It will also reach saturation at an earlier point in time, denoted by t2. Hence, to ensure proper operation of the known X-ray sensor, the exposure time has to be reduced.

Contrary to the known system, the X-ray sensor of the present invention can be operated at a higher frame rate. This sensor also charges more quickly as indicated by curve 2'. However, due to the higher frame rate, the X-ray sensor is reset more often, namely at regular intervals r2. This allows the total exposure time t1 to be maintained without risking saturation of the X-ray sensor.

Hence, according to the invention, the X-ray sensor is read out and reset a plurality of times during a single exposure. By appropriately choosing the frame rate, an optimal performance of the X-ray sensor can be ensured. Accordingly, the X-ray sensor can be used in combination with a variety of different X-ray sources, each characterized by its own maximum dose rate and target application.

Figure 2:
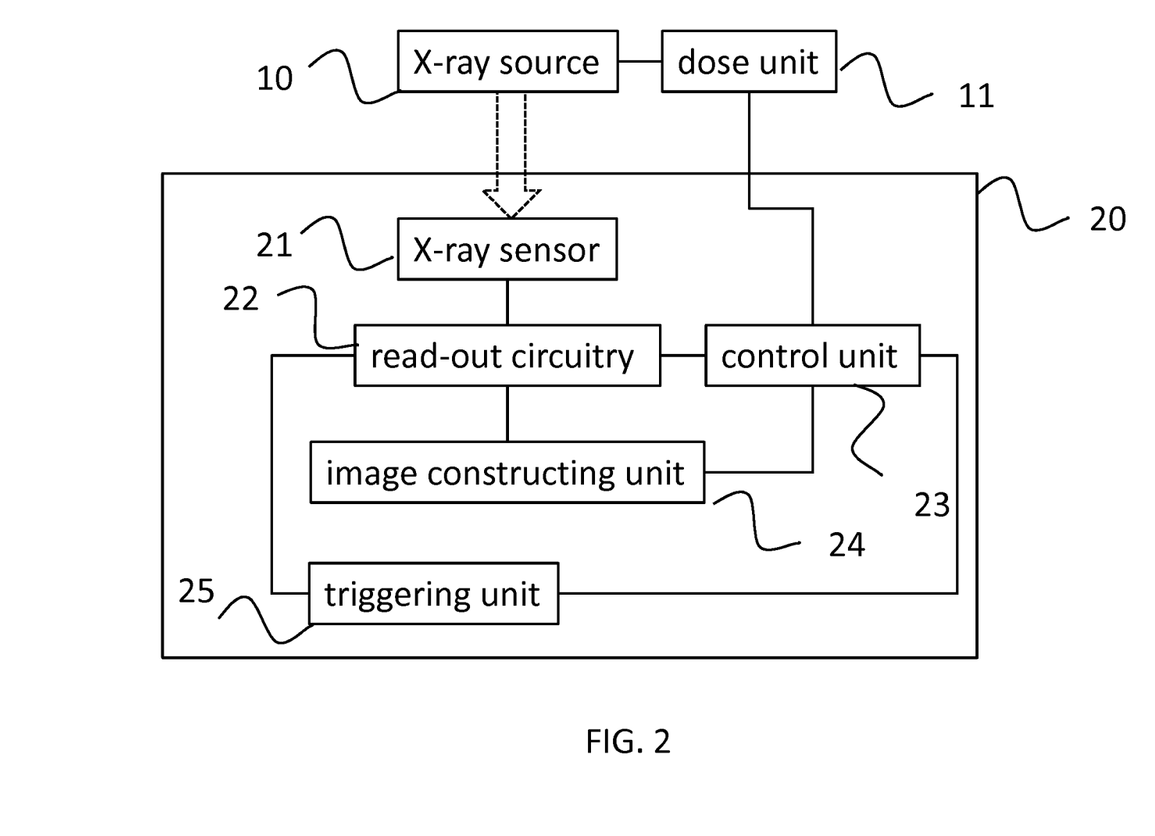
FIG. 2 illustrates an embodiment of the X-ray imaging system in accordance with the present invention.

FIG. 2 illustrates an embodiment of the X-ray imaging system in accordance with the present invention. The system comprises an X-ray source 10 that can be controlled by a dose unit 11. This latter unit allows exposure settings such as exposure time, dose rate, and collimator settings to be controlled.

The generated X-rays will be detected by an X-ray detector system 20, which comprises an X-ray sensor 21 for sensing the generated X-rays, read-out circuitry 22 for reading out image frames from X-ray sensor 21, an image constructing unit 24 for constructing an X-ray image based on the plurality of read out image frames, and a control unit 23 for controlling the image constructing unit 23, read-out circuitry 22 and/or dose unit 11.

X-ray sensor 21 can be embodied as a CMOS based sensor, comprising a sensor tile. Read-out circuitry 22, image constructing unit 24, and control unit 23 may be separately implemented on the sensor tile, either fully or in part.

X-ray detector system 20 may also comprise a triggering unit 25 that is configured to provide a triggering signal based on the obtained image frame(s). For instance, triggering unit 25 may provide a triggering signal to control unit 23 if an obtained image frame comprises useful X-ray exposure related information. This allows control unit 23 to control image constructing unit 24.

Figure 3:
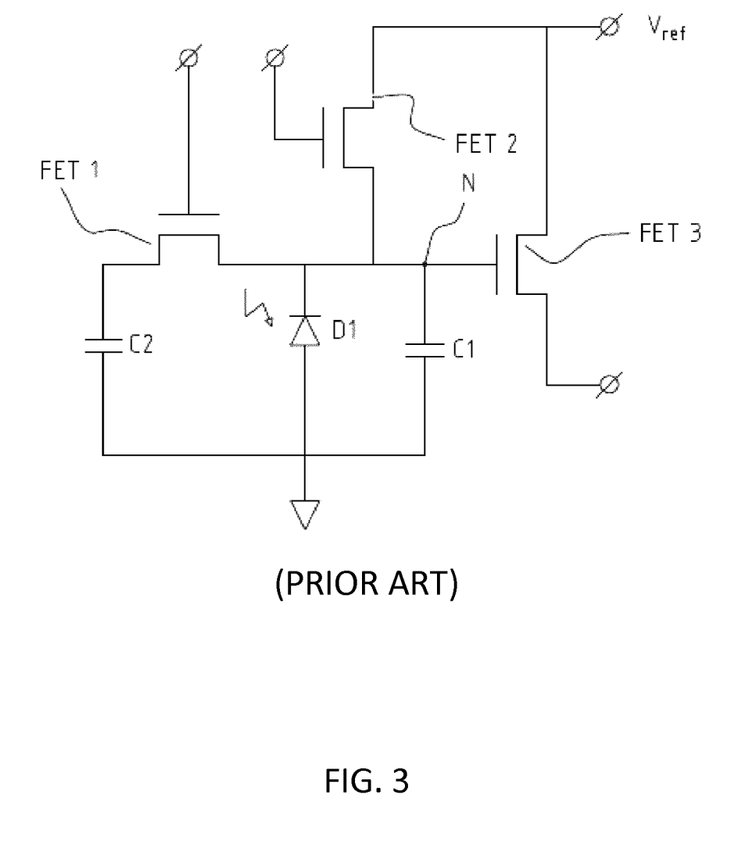
FIG. 3 illustrates a known pixel schematic for a CMOS based X-ray sensor.

FIG. 3 illustrates a known pixel schematic that can be used for X-ray sensor 21. This schematic assumes that X-ray sensor 21 is a CMOS based sensor having a pixel array comprising 3T type pixels. FIG. 3 depicts a known dual full-well pixel. It comprises a photodiode D1 that is connected to a first storage capacitor C1 and to a second storage capacitor C2 via a switching MOS field effect transistor (FET), designated as FET1. A reset MOSFET, designated as FET2, is used to reset the voltage at node N. Furthermore, a source follower MOSFET, designated as FET3, is used to output the voltage at node N to read-out circuitry (not shown).

The operation cycle of the pixel is described next. Here, it will be assumed that FET1 is in the conductive state, as a result of which C1 and C2 are connected in parallel to form a total capacitance Ctot=C1+C2.

As a first step, the voltage across Ctot, i.e. the voltage at node N, is reset by setting FET2 in the conductive state.

Next, FET2 is set in the non-conductive state. Incoming X-ray radiation will be converted to green light by the scintillator. This light will impinge on photodiode D1, thereby generating a photocurrent that will discharge Ctot.

After a predetermined amount of time, hereinafter referred to as integration time, the voltage at node N is read, via FET3, using read-out circuitry 22.

The voltage that has been read is indicative for the amount of X-ray radiation that fell onto the pixel during the integration time. However, this voltage is susceptible to process spreading, for instance a spreading in the threshold voltage Vt of the various FETs. To solve this problem, a double integration method can be used in which the voltage at node N is set, after which it is directly read out, i.e. essentially without having being affected by incoming radiation. The difference in voltage between this so-called dark value and the earlier mentioned read-out voltage provides a better indication for the incoming X-ray radiation. This technique is referred to as double data sampling (DDS).

As described above, read-out circuitry 22 is capable of reading out the voltages at nodes N for each pixel of the X-ray sensor. It is further configured to translate the read-out values into corresponding pixel values of an X-ray image. However, this translation step may also be performed by a dedicated unit remote from the X-ray sensor. Furthermore, read-out circuitry 22 or X-ray detector system 20 in general may comprise a memory for storing the pixel values for the X-ray image.

The size of Ctot determines the maximum amount of X-ray radiation that can be detected without saturation. More in particular, when the voltage at node N becomes too low, it can no longer be read out reliably using read-out circuitry 22. As such, the voltage at node N for which a reliable measurement can be performed ranges from Vlim up to the voltage directly after reset, wherein Vlim is typically around 1 Volt, depending on the read-out circuitry used.

If a low amount of X-ray radiation is to be expected, FET1 can be put in the non-conductive state. The total storage capacitor can then be approximated by Ctot=C1. This allows the pixel to operate in a low saturation level mode, in which only C1 is used, and a high saturation level mode, in which both C1 and C2 are used. This further allows a balance to be found between the impact of noise attributed to the first and possibly second storage capacitor, the so-called kTC reset noise, the amount of X-ray radiation to be expected, and the integration time.

Despite the fact the X-ray sensor shown in FIG. 3 offers the possibility of using two separate full-well capacities, performance may still be improved if this sensor is used to read-out a plurality of image frames during a single exposure.

Figure 4:
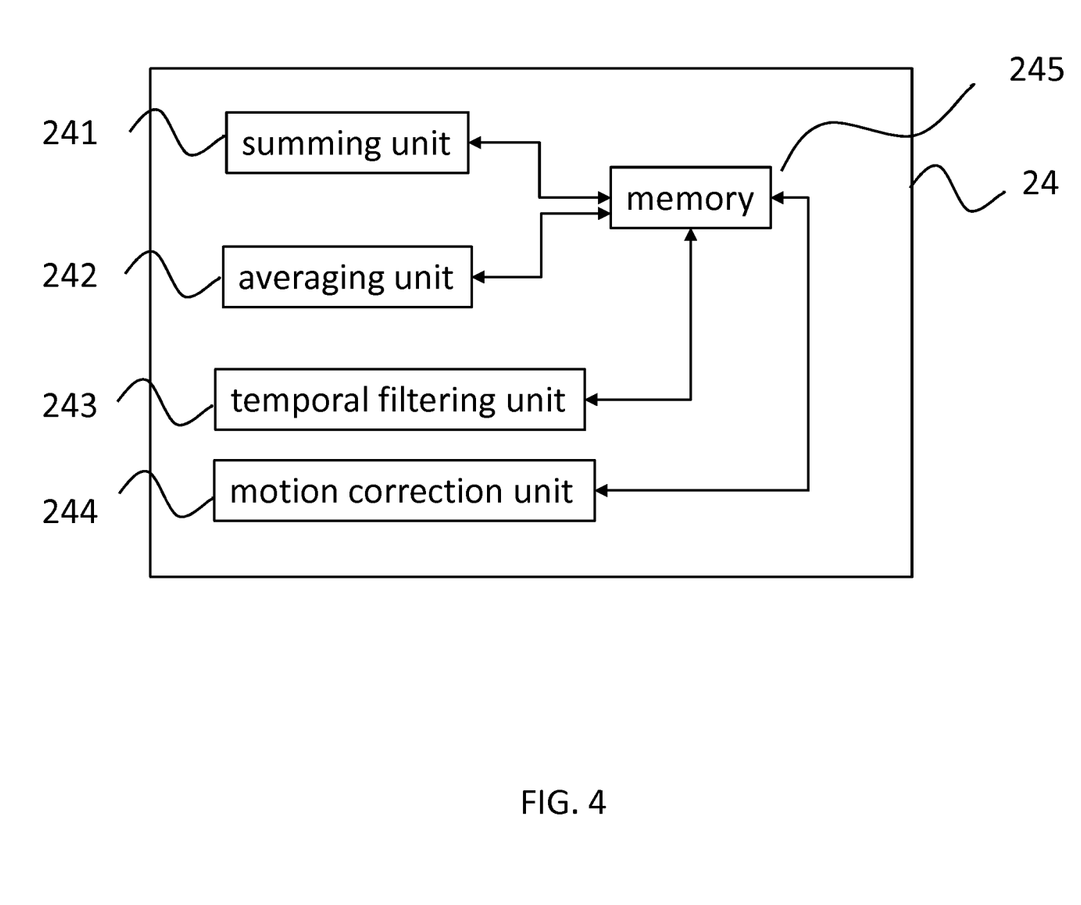
FIG. 4 illustrates an embodiment of the image constructing unit used in the X-ray detector system of the embodiment shown in FIG. 2.

FIG. 4 illustrates an embodiment of image constructing unit 24 of used in the X-ray detector system 20 shown in FIG. 2. It comprises a memory 245 that is configured to hold one or more image frames. A summing unit 241 may be used to sum the plurality of obtained image frames to construct the final X-ray image. In this case, memory 245 may be configured to store a past intermediate image frame to which a currently obtained image frame is added. Alternatively, an averaging unit 242 may be used to determine an average of the obtained plurality of image frames.

In an embodiment, memory 245 is configured to store all image frames that are obtained during a single exposure. This allows averaging unit 242 or summing unit 241 to compute the resulting X-ray image after exposure. In another embodiment, memory 245 is configured to store an intermediate image and a newly obtained X-ray image, which images can be used by summing unit 241 or averaging unit 242 to compute a new intermediate image to be stored in memory 245. Such computation during exposure allows dose control during exposure, for instance stopping the X-ray source if sufficient information has been obtained.

Figure 5:
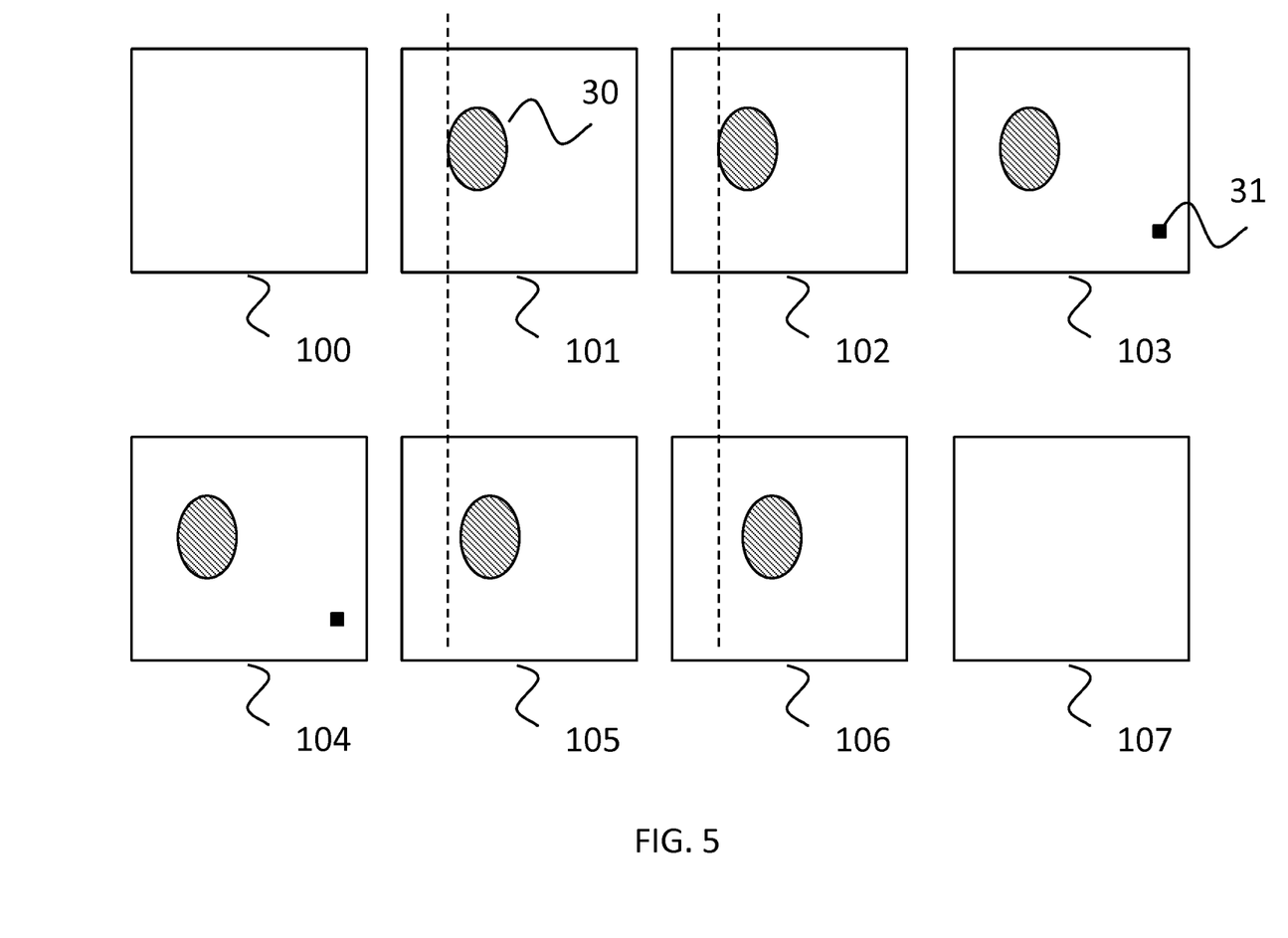
FIG. 5 illustrates a plurality of obtained image frames.

Image constructing unit 24 may also comprise a temporal filtering unit 243 and motion correction unit 244 which are described with reference to FIG. 5. This figure relates to a mode of the X-ray imaging system wherein the X-ray detector system is continuously reading out the pixel values of the X-ray sensor instead of being triggered by the X-ray source or by a control system that controls the X-ray source. In such case, X-ray sensor 21 or control unit 23 has no a priori knowledge about when the exposure will start. Instead, triggering unit 25 will monitor the obtained image frames 100-107, which in FIG. 5, are chronologically arranged.

Assume that an X-ray exposure is started in between image frames 100 and 101. Consequently, when image frame 100 is read, no useful information is present. Triggering unit 25 may be configured to evaluate image frames 100-107 to detect such useful information. For instance, triggering unit 25 may be configured to compare pixel values of the obtained image frame to a predefined threshold to determine whether an X-ray exposure has been detected by X-ray sensor 21. Such threshold may correspond to the noise floor.

Once useful information has been detected, for instance after evaluating image frame 101 that comprises a region 30 corresponding to part of an object that is imaged, triggering unit 25 may provide a triggering signal to control unit 23 which in turn may instruct summing unit 241 to start summing the image frames that are obtained from that point onwards, including image frame 101. Additionally, triggering unit 25 may determine that the X-ray exposure has ended once newly obtained image frames no longer comprise useful information, for instance image frame 107. In such case, triggering unit 25 may provide a triggering signal to control unit 23, which in turn instructs summing unit 241 to stop summing the images frames. The intermediate image frame that is stored in memory 245 at that point in time, or the X-ray image that is then constructed using the obtained image frames 101-106, may be exported as the final X-ray image.

A temporal filtering unit 243 may be used to remove artefacts from the obtained image frames, such as artefact 31. If temporal filtering unit 243 detects such artefact in an image frame, it may instruct summing unit 241 or averaging unit 242 to disregard such artefact either by replacing pixel values in the artefact region by default values or by replacing pixel values in the artefact region by the pixel values in the same region albeit in a different image frame that is artefact free.

A motion correction unit 244 may be used to correct for motion of the object to be imaged. For instance, image frames 105 and 106 illustrate that the part of the object corresponding to region 30 has shifted at the time that image frames 105 and 106 were obtained. Without motion correction, such displacement would result in a blurring effect on the final X-ray image. Motion correction unit 244 may correct such motion by translating and/or rotating pixels in image frames 105 and 106 such that the position and/or orientation of region 30 in those frames corresponds to the position and/or orientation of region 30 in other frames.

Here, it is noted that the use of motion correction unit 244 and temporal filtering unit 243 is made possible due to the fact that a plurality of image frames are obtained instead of a single X-ray image. This effectively shortens the exposure time for each individual image frame allowing the influence of undesirable effects that occur only during a part of the exposure time, such as motion or glitches, to be removed from the final X-ray image.

According to the present invention, the dynamic range of X-ray images can be improved as will be explained next. For CMOS based sensors, the two dominant noise sources are kTC noise and read-out noise. Both noise contributions are or can be decreased by the system according to the present invention.

The dynamic range of an X-ray image that has been constructed using a single image frame can be computed using:

$$\text{dynrange} = S_{SAT}/\sqrt{N_{ro}^2 + 2N_{kTC}^2}$$

where $S_{SAT}$ is the maximum signal level, $N_{ro}$ the read-out noise, which is defined as the total electronic noise except for kTC reset noise, C the storage capacitance, k Boltzmann's constant, T the temperature, and $N_{kTC}$ the reset noise. The noise and signal levels are expressed in digital numbers (DN). The factor 2 in the equation above comes from the fact that for one reading, the pixel needs to be reset once and read-out once.

For an X-ray image in which the pixel values are expressed in 12 bits digital numbers, the maximum signal level corresponds to $2^{12}-1$. It is noted that this level does not depend on the full-well capacity. More in particular, when the pixel is just saturated, the voltage at node N in FIG. 3 is at a given value regardless of the full-well capacity. This voltage is converted to a signal level expressed in digital numbers.

In the example above, the reset noise can be computed using:

$$N_{kTC} = D\sqrt{kT/C}$$

where D is the conversion factor from Volt to DN.

This example has to be compared to the situation wherein the full-well capacity is reduced by a factor M but wherein M image frames are obtained instead of a single image. In this case, the maximum signal of the X-ray image increases by a factor M due to the fact that for each image frame, the maximum signal level equals $S_{SAT}$. The total noise is now given by:

$$N_{tot} = \sqrt{\sum_{m=1}^{M}[(N_{ro,m})^2 + 2(N_{kTC,m})^2]} = \sqrt{MN_{ro}^2 + 2D^2M^2\frac{kT}{C}}$$

where it has been assumed that the read-out noise $N_{ro,m}$ for each image frame equals the read-out noise $N_{ro}$. It can therefore be concluded that the maximum signal level is increased by a factor M, the read-out noise is increased by a factor $M^{0.5}$, and the reset noise is increased with a factor M. Due to the fact that the read-out noise does not scale with M, the dynamic range is improved compared to the situation wherein a single image frame is obtained during an exposure.

The example above demonstrated that the read-out noise can be effectively reduced by using multiple image frames. The same holds for the reset noise provided that a double data sampling (DDS) technique is used for reading out the pixel values.

In DDS, a pixel is read to provide a signal S. Then, the pixel is reset after which the pixel is directly read to provide a reset signal R. By subtracting these two signals, i.e. (R-S) the influence of processing spread, encountered during manufacturing of the CMOS X-ray pixel sensor array, can be eliminated from the overall measurement.

For instance, when the pixel value is first read, it comprises a part E1 related to the X-ray exposure and a noise part N1. Then, the pixel is reset, and a reset signal R1 is read. This reset signal comprises a constant part denoted by C and a noise part denoted by N2. For the second pixel value reading, the signal can be expressed as E2+N2, where it is noted that the contribution of noise N2 has remained on the storage capacitor. The corresponding reset signal can be expressed as C+N3. Combining both DDS measurements yields:

$$(R1-S1)+(R2-S2)=(C+N2-E1-N1)+(C+N3-E2-N2)$$
$$=2\times C-E1-E2+N3-N1$$

Hence, the noise distribution of N2 is cancelled out as this noise is part of the reset signal and part of the actual pixel reading. In general, if DDS techniques are used, the noise calculation becomes:

$$N_{tot} = \sqrt{\sum_{m=1}^{M}(N_{ro,m})^2 + 2N_{kTC,m}}^2 =$$

$$\sqrt{MN_{ro}^2 + 2D^2\frac{kT}{C/M}} = \sqrt{M}\sqrt{N_{ro}^2 + 2D^2\frac{kT}{C}}$$

The dynamic range is therefore improved by a factor of $M^{0.5}$ compared to the known system.

As demonstrated above, it is advantageous to use a high frame rate in order to improve the dynamic range. However, in most applications, the analog-to-digital (ADC) converter limits the frame rate that can be achieved as for most applications the analog-to-digital conversion is the time limiting factor. However, according to the present invention a lower bit-depth ADC converter may be used that allows a higher frame rate while still improving the dynamic range of the resulting X-ray image.

As an example, a single image X-ray imaging process using a 14 bit ADC is compared to the imaging process of the present invention that also uses a 14 bit ADC, and to the imaging process of the present invention that uses a 12 bit ADC albeit at a frame rate that is 4 times higher.

It is assumed that a saturation dose of 2.5 mGy is required for the application. It is further assumed that this results in a required full-well capacity of 3.1 Me. In this case, the electronic noise, i.e. the sum of the read-out noise and the reset noise, is assumed to be 2 DN. The maximum signal level in this case corresponds to 16384 (14 bit ADC). Consequently, a dynamic range of the resulting X-ray image equals 8192.

If a frame rate M of 10 frames per second is used, the required storage capacity can be lowered to 0.31 Me. Using DDS, the electronic noise is increased by a factor $M^{0.5}$ up to 6.3 DN, whereas the maximum signal level is increased by a factor M up to 163840 DN. As a result, the dynamic range is increased by a factor $M^{0.5}$ up to 25905.

If an ADC is used with a bit depth of 12 bits, and a frame rate of 40 frames per second, the electronic noise equals to $40^{0.5} \times 0.5$ DN=3.2 DN. Here, 0.5 DN corresponds to the electronic noise of the single image frame process if the noise is expressed using a bit depth of 12 bits.

The maximum signal level now corresponds to 40×4096 (12 bit ADC)=163840 DN. Consequently, despite the lower bit depth of the ADC, another doubling of the dynamic range can be obtained. Generally speaking, lowering the bit depth of the ADC by n bits and increasing the frame rate by a factor n improves the dynamic range by a factor $n^{0.5}$. This improvement cannot be achieved endlessly as at some point quantisation noise could become dominant and/or other components in the read-out circuitry become the limiting factor for the maximum frame rate.

In the description above, it has been shown that using a lower full-well capacity in combination with obtaining a plurality of image frames during a single exposure improves the dynamic range of the resulting X-ray image. It further improves the versatility of the X-ray sensor.

Although the invention has been described using embodiments thereof, it should be apparent to the skilled person that the invention is not limited thereto and that modifications are possible without departing from the scope of the invention, which is defined by the appended claims.

The invention claimed is:

1. An X-ray imaging system for obtaining an X-ray image of an object during a single exposure thereof, comprising:
    an X-ray source;
    an X-ray detector system configured for detecting X-rays and for obtaining an image frame based on the detected X-rays;
    wherein the X-ray detector system is configured for obtaining a plurality of image frames at a given frame rate during said single exposure and the X-ray detector system is configured for constructing said X-ray image using the obtained plurality of image frames,
    wherein the X-ray detector system comprises an X-ray sensor including an array of pixels, read-out circuitry for reading out the array of pixels for forming said image frame, and a control unit for controlling the read-out circuitry,
    wherein a full-well capacity of the pixels results in a pixel saturation dose that matches a combination of a dose rate of the X-ray source and the frame rate, and
    wherein the pixels in said pixel array operate close to or at saturation based on the combination of the full-well capacity, the dose rate of the X-ray source, and the frame rate.

2. The X-ray imaging system according to claim 1, wherein the X-ray detector system is configured to construct said X-ray image by summing the obtained plurality of image frames or by averaging the obtained plurality of image frames.

3. The X-ray imaging system according to claim 1, further comprising a dose setting unit for setting exposure settings in dependence of a target application of the X-ray imaging system, wherein the exposure settings comprise an exposure time.

4. The X-ray imaging system according to claim 1, wherein the frame rate of the read-out circuitry can be set by the control unit within a predefined range and/or wherein the dose rate of the X-ray source can be set within a predefined range.

5. The X-ray imaging system according to claim 1, wherein the X-ray detector system further comprises an image constructing unit for said constructing of the X-ray image using said obtained plurality of image frames, said image constructing unit being configured to sum or average the obtained plurality of image frames.

6. The X-ray imaging system according to claim 5, wherein the X-ray detector system comprises a triggering unit, which is configured to detect whether an obtained image frame or one or more predefined regions thereof comprises one or more pixel values that exceed the noise floor or a predefined level, and wherein the control unit is configured to control the image constructing unit to start summing or averaging the obtained image frames only after the triggering unit has detected such pixel values.

7. The X-ray imaging system according to claim 6, wherein the control unit is configured to control the image constructing unit to stop summing or averaging the obtained image frames after the triggering unit has detected that newly obtained image frames or said one or more predefined regions thereof no longer comprise one or more pixel values that exceed the noise floor or a predefined level.

8. The X-ray imaging system according to claim 5, wherein the image constructing unit comprises a motion correction unit configured to perform motion correction on said plurality of obtained image frames prior to summing or averaging the image frames to form said X-ray image.

9. The X-ray imaging system according to claim 5, wherein the image constructing unit is configured to construct an intermediate X-ray image at a point in time during an X-ray exposure using the plurality of image frames obtained thus far.

10. The X-ray imaging system according to claim 9, wherein the X-ray imaging system is configured to evaluate the intermediate X-ray image and to determine a quality parameter of said intermediate X-ray image and to perform dose control of the X-ray source based on said quality parameter, said quality parameter comprising an intensity in a darkest part of the intermediate X-ray image or a contrast in said intermediate X-ray image or region thereof.

11. The X-ray imaging system according to claim 10, wherein performing dose control comprises adjusting a dose rate, an exposure time, or a collimator setting of the X-ray source.

12. The X-ray imaging system according to claim 5, wherein the image constructing unit comprises a temporal filtering unit configured to detect one or more regions having deviating pixel values in an image frame among said plurality of image frames, the one or more regions being only detectable in one or a few of the obtained image frames, the temporal filtering unit being configured to disregard said region(s) during said X-ray image constructing.

13. The X-ray imaging system according to claim 1, wherein the X-ray detector system comprises an X-ray sensor, said X-ray sensor selected from the group consisting of a CMOS X-ray sensor, an amorphous-silicon based detector, a charge-coupled device, and a direct conversion based X-ray sensor wherein X-rays are detected without an intermediate step of converting the X-rays to visible light.

14. The X-ray imaging system according to claim 13, wherein the X-ray detector system comprises a CMOS X-ray sensor having a pixel array comprising 3T type pixels, and wherein the read-out circuitry is configured for reading out the array of pixels using a double data sampling (DDS) technique.

15. The X-ray imaging system according to claim 1, wherein one or more of the group consisting of the image constructing unit, the read-out circuitry, and the control unit is integrated in the X-ray sensor.

16. An X-ray sensor suitable for use in an X-ray system, wherein the X-ray sensor is configured as described in claim 15.

17. A method for manufacturing an X-ray sensor having an array of pixels that is intended to be implemented in an X-ray imaging system that is configured to operate using a given dose rate, the method comprising:

selecting read-out circuitry to be used in or for the X-ray sensor, said read-out circuitry having a given frame rate;
determining a desired saturation dose of pixels of the X-ray sensor based on the frame rate and the dose rate;
determining a full-well capacity from the determined saturation dose; and
manufacturing the X-ray sensor using the determined full-well capacity, wherein manufacturing the X-ray sensor comprises manufacturing the X-ray sensor selected from the group consisting of a CMOS X-ray sensor, an amorphous-silicon based detector, a charge-coupled device, and a direct conversion based X-ray sensor wherein X-rays are detected without an intermediate step of converting the X-rays to visible light.

* * * * *